United States Patent
Dohrn

(10) Patent No.: US 12,511,573 B2
(45) Date of Patent: Dec. 30, 2025

(54) SYSTEM AND METHOD FOR SELECTING A CANDIDATE TRANSFER APPARATUS

(71) Applicant: Hammel Companies, Inc., Pittsburgh, PA (US)

(72) Inventor: Joseph Charles Dohrn, Woodland Park, CO (US)

(73) Assignee: Hammel Companies Inc., Pittsburgh, PA (US)

(*) Notice: Subject to any disclaimer, the term of this patent is extended or adjusted under 35 U.S.C. 154(b) by 1031 days.

(21) Appl. No.: 17/195,734

(22) Filed: Mar. 9, 2021

(65) Prior Publication Data

US 2022/0121986 A1   Apr. 21, 2022

Related U.S. Application Data

(63) Continuation of application No. 17/072,653, filed on Oct. 16, 2020, now Pat. No. 10,970,652.

(51) Int. Cl.
    *G06N 20/00* (2019.01)
    *G06F 16/2457* (2019.01)

(52) U.S. Cl.
    CPC ....... *G06N 20/00* (2019.01); *G06F 16/24578* (2019.01)

(58) Field of Classification Search
    None
    See application file for complete search history.

(56) References Cited

U.S. PATENT DOCUMENTS

| | | |
|---|---|---|
| 8,244,645 B2 | 8/2012 | Malitski |
| 8,429,019 B1 | 4/2013 | Yeatts et al. |
| 10,255,577 B1 | 4/2019 | Steves et al. |
| 10,360,616 B2 | 7/2019 | Lopez et al. |
| 2018/0068269 A1 | 3/2018 | Pillai et al. |
| 2019/0114587 A1 | 4/2019 | Asifullah et al. |
| 2019/0149952 A1 | 5/2019 | Parks, Jr. et al. |

(Continued)

FOREIGN PATENT DOCUMENTS

| | | | | |
|---|---|---|---|---|
| WO | WO-0161549 A2 | * | 8/2001 | ............. G06Q 10/04 |
| WO | WO-0211027 A1 | * | 2/2002 | ......... G06Q 10/0631 |

OTHER PUBLICATIONS

Sun et al., Fuzzy Programming Approaches for Modeling a Customer-Centred Freight Routing Problem in the Road-Rail Intermodal Hub-and-Spoke Network with Fuzzy Soft Time Windows and Multiple Sources of Time Uncertainty, 2019, Mathematics 2019, 7, 739; doi: 10.3390/math7080739, pp. 1-41 (Year: 2019).*

(Continued)

*Primary Examiner* — David R Vincent
(74) *Attorney, Agent, or Firm* — Caldwell Intellectual Property Law

(57) ABSTRACT

A method for determining a transfer apparatus based on user preferences includes receiving, by a computing device, at least a transfer invocation and a plurality of user preferences and generating, by the computing device, and for each candidate transfer apparatus of a plurality of candidate transfer apparatuses, a plurality of performance prognoses corresponding to the plurality of user preferences. The method includes selecting, by the computing device, a candidate transfer apparatus as a function of the plurality of performance prognoses and providing, by the computing device, the selected candidate transfer apparatus to a user.

20 Claims, 5 Drawing Sheets

(56) References Cited

U.S. PATENT DOCUMENTS

2019/0180234 A1  6/2019  Healy
2020/0118071 A1  4/2020  Venkatesan et al.

OTHER PUBLICATIONS http://webcache.googleusercontent.com/search?q=cache:H4SCpiun06QJ:chainlinkresearch.com/research/detail.cfm%3Fguid%3D3F522843-3048-78A9-2F91-441A675AB23B+&cd=1&hl=en&ct=clnk&gl=us; Title: Optimizing the Customer Experience Home Delivery: Part Two—Continuous Optimization of Delivery; Date: Feb. 23, 2017; By: Ann Grackin.

* cited by examiner

SYSTEM AND METHOD FOR SELECTING A CANDIDATE TRANSFER APPARATUS

CROSS-REFERENCE TO RELATED APPLICATIONS

This application is a continuation of U.S. Nonprovisional application Ser. No. 17/072,653 filed on Oct. 16, 2020 and entitled "SYSTEM AND METHOD FOR SELECTING A CANDIDATE TRANSFER APPARATUS," which is incorporated by reference herein in its entirety.

FIELD OF THE INVENTION

The present invention generally relates to the field of machine-learning. In particular, the present invention is directed to selecting a candidate transfer apparatus.

BACKGROUND

Machine-learning methods are increasingly valuable for analysis of patterns and problem-solving using large quantities of data. However, where the data is large and varied enough, optimizing instructions for users from machine-learning outputs can become untenable, especially with tradeoffs between sophistication and efficiency.

SUMMARY OF THE DISCLOSURE

In an aspect, a method for determining a transfer apparatus based on user preferences includes receiving, by a computing device, at least a transfer invocation and a plurality of user preferences and generating, by the computing device, and for each candidate transfer apparatus of a plurality of candidate transfer apparatuses, a plurality of performance prognoses corresponding to the plurality of user preferences. The method includes selecting, by the computing device, a candidate transfer apparatus as a function of the plurality of performance prognoses and providing, by the computing device, the selected candidate transfer apparatus to a user.

In another aspect, a system for selecting a candidate transfer apparatus based on user preferences includes a computing device, the computing device configured to receive at least a transfer invocation and a plurality of user preferences, generate, for each candidate transfer apparatus of a plurality of candidate transfer apparatuses, a plurality of performance prognoses corresponding to the plurality of user preferences, select a candidate transfer apparatus as a function of the plurality of performance prognoses, and provide the selected candidate transfer apparatus to a user.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION

At a high level, aspects of the present disclosure are directed to systems and methods for selecting a transfer apparatus for transfer of pieces amongst a plurality of transfer apparatuses using a machine-learning process. In non-limiting illustrative embodiments, system may determine transfer apparatus by formulating and maximizing or minimizing an objective function. Objective function may have inputs and/or a solution set including a plurality of performance prognoses, where each performance prognoses, where each performance prognoses correspond to a plurality of user preferences. A preferable transfer apparatus selected will be most closely aligned with a user's preference.

Figure 1:
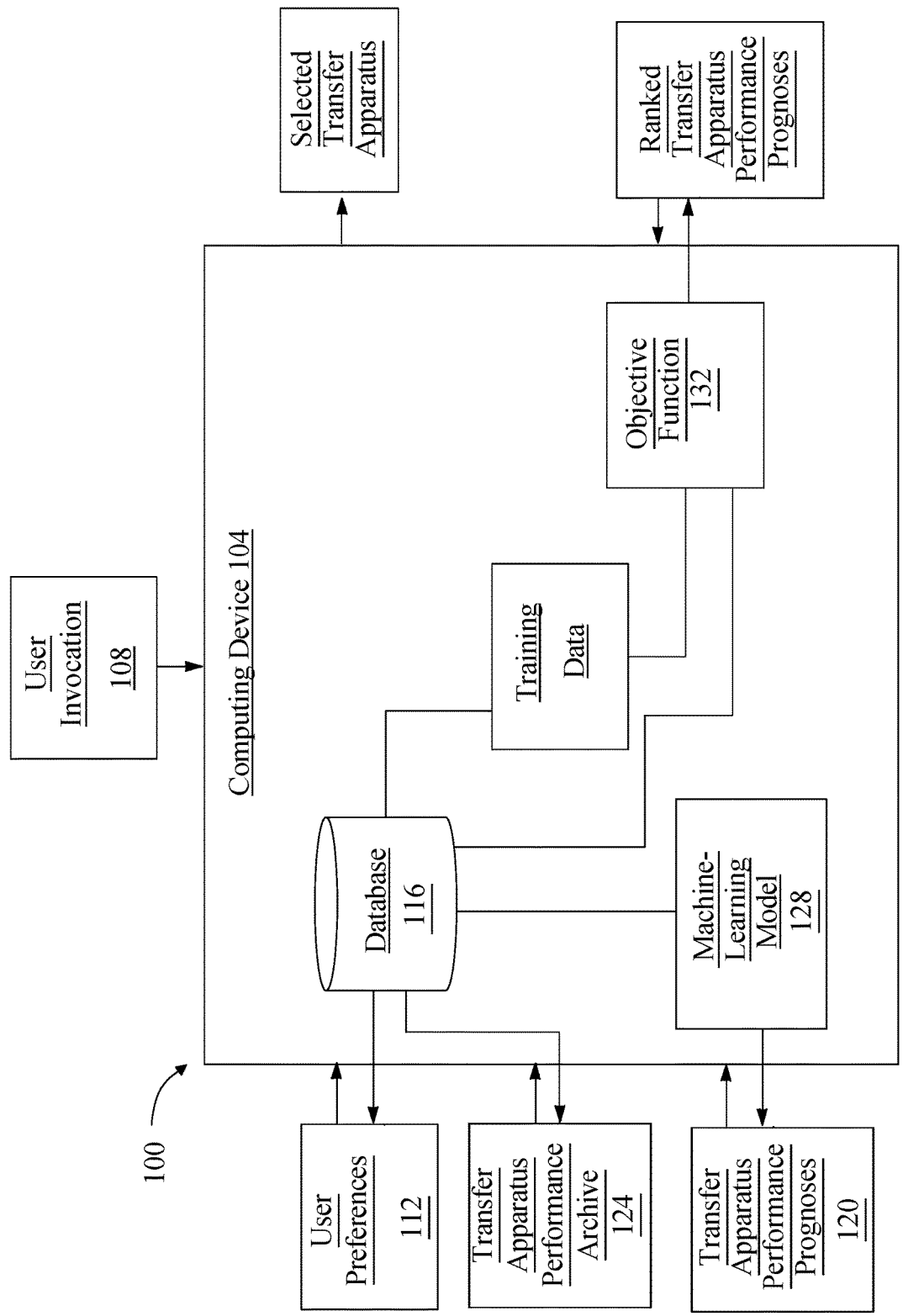
FIG. 1 is a block diagram illustrating an exemplary embodiment of a system for selecting a candidate transfer apparatus using a machine-learning process.

Referring now to FIG. 1, an exemplary embodiment of a system 100 for selecting a candidate transfer apparatus is illustrated. System includes a computing device 104. Computing device 104 may include any computing device as described in this disclosure, including without limitation a microcontroller, microprocessor, digital signal processor (DSP) and/or system on a chip (SoC) as described in this disclosure. Computing device may include, be included in, and/or communicate with a mobile device such as a mobile telephone or smartphone. Computing device 104 may include a single computing device operating independently, or may include two or more computing device operating in concert, in parallel, sequentially or the like; two or more computing devices may be included together in a single computing device or in two or more computing devices. Computing device 104 may interface or communicate with one or more additional devices as described below in further detail via a network interface device. Network interface device may be utilized for connecting computing device 104 to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing device. Computing device 104 may include but is not limited to, for example, a computing device or cluster of computing devices in a first location and a second computing device or cluster of computing devices in a second location. Computing device 104 may include one or more computing devices dedicated to data storage, security, distribution of traffic for load balancing, and the like. Computing device 104 may distribute one or more computing tasks as described below across a plurality of computing devices of computing device, which may operate in parallel, in series, redundantly, or in any other manner used for distribution of tasks or memory between computing devices. Computing device 104 may be implemented using a "shared nothing" architecture in which data is cached at the worker, in an embodiment, this may enable scalability of system 100 and/or computing device.

Computing device 104 may be designed and/or configured to perform any method, method step, or sequence of method steps in any embodiment described in this disclosure, in any order and with any degree of repetition. For instance, computing device 104 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Computing device 104 may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

With continued reference to FIG. 1, a computing device 104 is configured to select a candidate transfer apparatus. A "transfer apparatus," for the purposes of this disclosure is a plan and means to physically transfer pieces from one location to another. In non-limiting illustrative embodiments, a transfer apparatus may include freight carriers like cargo jets, steamships, barges, tractor trailer freight lines as well as the routes from an origin location to a destination location, as well as any stops. The term "pieces," for the purposes of this disclosure, refers to any physical item or items a user desires to move from one physical destination to another physical destination. A piece or pieces may include, without limitation, products, parcels, boxes, crates, assemblies, or a combination thereof. Computing device 104 is configured to receive a transfer invocation 108 from a user. A "transfer invocation," for the purpose of this disclosure, is a solicitation of a user to system 100 for a piece to be transferred from an origin physical location to a destination physical location. A transfer invocation may include, without limitation, an electronic purchase order, a mailed paper purchase order, use of an electronic interface, communication between one or more servers, and the like, alone or in combination. System 100 and computer device 104 are further configured to receive user preferences 112. "User preferences," for the purposes of this disclosure, are selections made by a user identifying desired or required aspects of transfer apparatus. User preferences, may include, without limitation, destination, cost, route or routes, speed of transfer, transfer method or means, among others. User preferences 112 may be input by a user at the time of user invocation 108, at a different time, or received by computing device 104 from a database 116.

Figure 2:
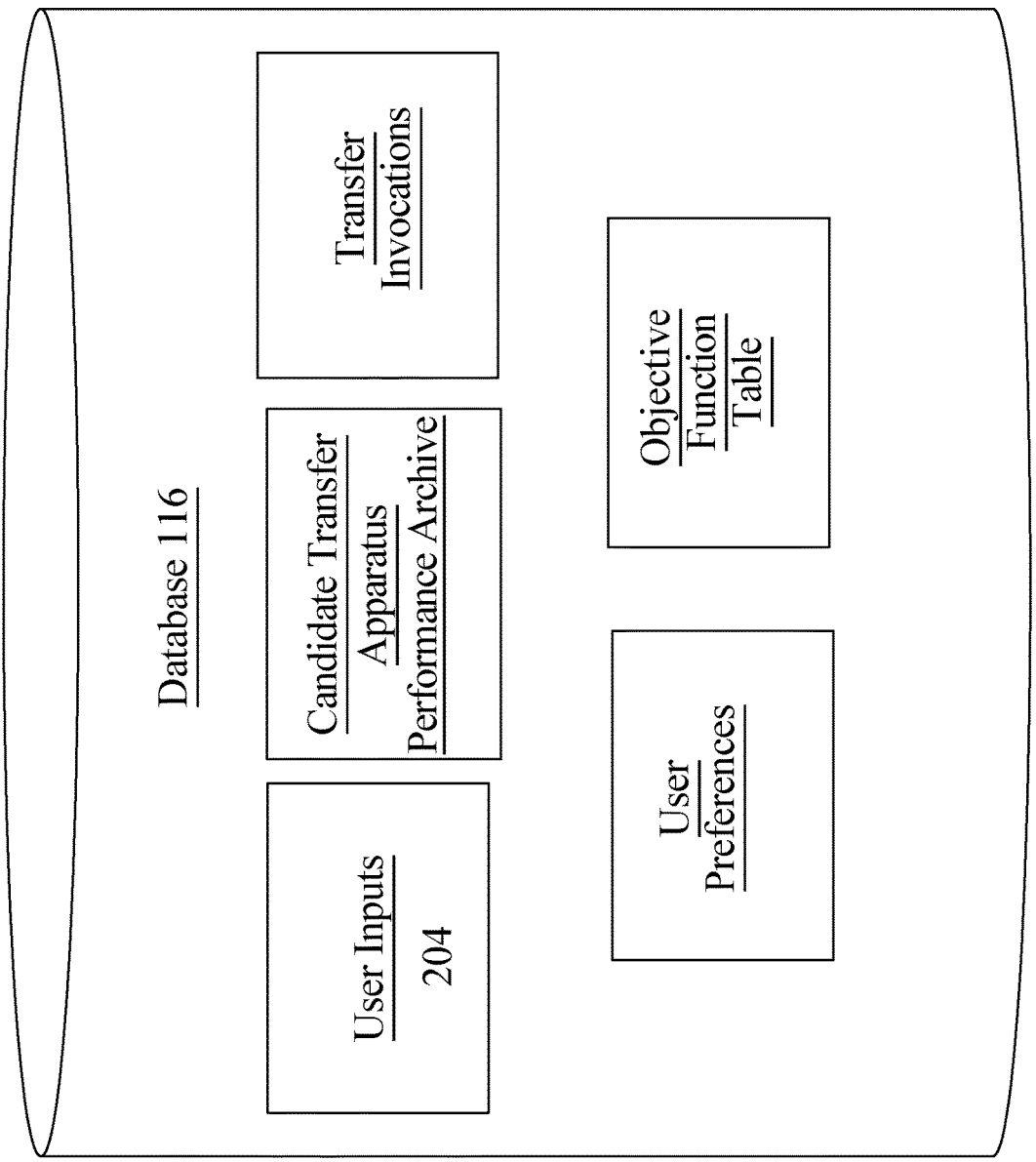
FIG. 2 is a block diagram illustrating an exemplary embodiment of a database.

Referring now to FIG. 2, an embodiment of database 116 is illustrated. Database 116 may be implemented, without limitation, as a relational database, a key-value retrieval database such as a NOSQL database, or any other format or structure for use as a database that a person skilled in the art would recognize as suitable upon review of the entirety of this disclosure. Database 116 may alternatively or additionally be implemented using a distributed data storage protocol and/or data structure, such as a distributed hash table or the like. Database 116 may include a plurality of data entries and/or records as described above. Data entries in a database may be flagged with or linked to one or more additional elements of information, which may be reflected in data entry cells and/or in linked tables such as tables related by one or more indices in a relational database. Persons skilled in the art, upon reviewing the entirety of this disclosure, will be aware of various ways in which data entries in a database may store, retrieve, organize, and/or reflect data and/or records as used herein, as well as categories and/or populations of data consistently with this disclosure.

Still referring to FIG. 2, one or more database tables in database 116 may include, as a non-limiting example, a plurality of user inputs table 24. Plurality of user inputs table 204 may be a table storing each input a user may utilize in at least a transfer invocation 108. For instance, and without limitation, database 116 may include plurality of user inputs table 204 listing each user input and associated categories thereof. Database 116 may include, as a non-limiting example, past user invocations 108 and the user preferences associated with that, or other user invocations. Continuing to refer to FIG. 2, one or more database tables in database 116 may include, as a non-limiting example, a record of user preferences 112. User preferences 112 may be stored, moved, manipulated, or received by computing device 104 for any process as described in the entirety of this disclosure. User preferences 112 may include any user preference as described in the entirety of this disclosure.

Continuing to refer to FIG. 2, one or more database tables in database 116 may include, as a non-limiting example, a candidate transfer apparatus performance archive 124 stored in matrices, tables, or otherwise. Candidate transfer apparatus performance archive 124 may be received by computing system 104 for use in any process as described in the entirety of this disclosure. Candidate transfer apparatus performance archive 124 may include any information as described in the entirety of this disclosure as well as, in a non-limiting example, constraints like piece type, transfer apparatus restrictions, defined prices, stop limits, customer constraints, transfer apparatus prior commitments, truckload lanes, cross-dock transfer regions, committed loads per day, geographical commitments, and piece limits per day or limits per type, to name a few.

Referring again to FIG. 1, computing device 104 may receive user preferences 112 from a user or database 116 to generate, for each candidate transfer apparatus of a plurality of candidate transfer apparatuses, a plurality of performance prognoses 120. "Performance prognoses," as used in this disclosure, are predictions of how closely candidate transfer apparatuses correspond to user preferences as described in the entirety of this disclosure. Performance prognoses 120, may be represented in any suitable form, which may include, without limitation, vectors, matrices, coefficients, scores, ranks, or other numerical comparators, and the like. With continued reference to FIG. 1, a "vector" as defined in this disclosure is a data structure that represents one or more a quantitative values and/or measures of user preferences, performance prognoses, or any other data structure as described in the entirety of this disclosure. A vector may be represented as an n-tuple of values, where n is at least two values, as described in further detail below; a vector may alternatively or additionally be represented as an element of a vector space, defined as a set of mathematical objects that can be added together under an operation of addition following properties of associativity, commutativity, existence of an identity element, and existence of an inverse element for each vector, and can be multiplied by scalar values under an operation of scalar multiplication compatible with field multiplication, and that has an identity element is distributive with respect to vector addition, and is distributive with respect to field addition. Each value of n-tuple of values may represent a measurement or other quantitative value associated with a given category of data, or attribute, examples of which are provided in further detail below; a vector may be represented, without limitation, in n-dimensional space using an axis per category of value represented in n-tuple of values, such that a vector has a geometric direction characterizing the relative quantities of attributes in the n-tuple as compared to each other. Two vectors may be considered equivalent where their directions, and/or the relative quantities of values within each vector as compared to each other, are the same; thus, as a non-limiting example, a vector represented as [5, 10, 15] may be treated as equivalent, for purposes of this disclosure, as a vector represented as [1, 2, 3]. Vectors may be more similar where their directions are more similar, and more different where their directions are more divergent; however, vector similarity may alternatively or additionally be determined using averages of similarities between like attributes, or any other measure of similarity suitable for any n-tuple of values, or aggregation of numerical similarity measures for the purposes of loss functions as described in further detail below. Any vectors as described herein may be scaled, such that each vector represents each attribute along an equivalent scale of values. Each vector may be "normalized," or divided by a "length" attribute, such as a length attribute l as derived using a Pythagorean norm: $l=\sqrt{\sum_{i=0}^{n} a_i^2}$, where $a_i$ is attribute number i of the vector. Scaling and/or normalization may function to make vector comparison independent of absolute quantities of attributes, while preserving any dependency on similarity of attributes.

With continued reference to FIG. 1, the generation of performance prognoses 120 corresponding to user preferences 112, wherein generating each plurality of performance prognoses 120 further comprises receiving, for a corresponding candidate transfer apparatus of the plurality of candidate transfer apparatus, a candidate transfer apparatus archive 124. A "candidate transfer apparatus archive," as used in this disclosure, is a record of past transfer apparatuses operating according to user preferences. A candidate transfer apparatus archive may include, without limitation, matrices, libraries, lists, scores, pools, and the like. Candidate transfer apparatus archive 124 may indicate deviations from user preferences 112 corresponding to candidate transfer apparatus performance. Candidate transfer apparatus archive 124 may include, without limitation, deviations in the form of elapsed time between a user inputted time of arrival and actual time of arrival of a transferred piece, damage to pieces, difference between actual route and preferred route, in miles, for example, difference between preferred cost and actual cost, among others. Additionally, candidate transfer apparatus archive 124 may include, without limitation, contracted pricing between a user and a candidate transfer apparatus, further including contracted discounts, contracted rules, transfer apparatus capacity per day, transfer apparatus capacity per geography, and the like. Candidate transfer apparatus archive 124 may employ data in any structure as described in the entirety of this disclosure. Candidate transfer apparatus archive 124 may be inputted by a user, or received from a database, the database consistent with the description in the entirety of this disclosure.

With continued reference to FIG. 1, computing device 104 may be configured to generate a plurality of candidate transfer apparatus models 128 by receiving candidate transfer apparatus performance archive 124. Candidate transfer apparatus performance archive 124 may include a plurality of entries correlating user preferences to with candidate transfer apparatus performance. Candidate transfer apparatus performance archive 124 may include a score, metric, function, vector, matrix, numerical value, or the like, which describes a qualitative and/or quantitative mathematical proportion, propensity, or any relationship correlating the likelihood, possibility, and/or probability of a transfer apparatus aligning with user preferences consistent with the description in the entirety of this disclosure.

With continued reference to FIG. 1, the generation of performance prognoses 120 corresponding to user preferences 112, wherein generating each plurality of performance prognoses 120 further comprises training, as a function of candidate transfer apparatus performance archive 124 and a supervised machine-process, a candidate transfer apparatus model 128. Candidate transfer apparatus performance archive 124 may be used as training data to train supervised machine-learning process. Candidate transfer apparatus model 128 may, as a non-limiting example, model a transfer of pieces form an origin physical location to a destination physical location. Candidate transfer apparatus model 128 may include loads like less-than-truckload (LTL), which may be considered baseline, full direct truckload, where a full truckload is contracted to directly transfer from supplier to user's destination and where a full truckload comprises enough pieces to consume a full trailer, multi-stop truckloads, where a pieces are coordinated and sequenced from user to user, minimizing miles for the route for example, and cross-dock direct truckloads, where users in a single geographic region are transferred as a single consolidated truckload to a "cross-dock." A "cross-dock," for the purposes of this disclosure is a location where a single truckload is broken down to further transfer pieces from that single truckload to individual separate users from that single geographic location. Additionally, candidate transfer apparatus model 128, may include multiple transfer options where direct transfers and cross-dock transfers may be used simultaneously.

Figure 3:
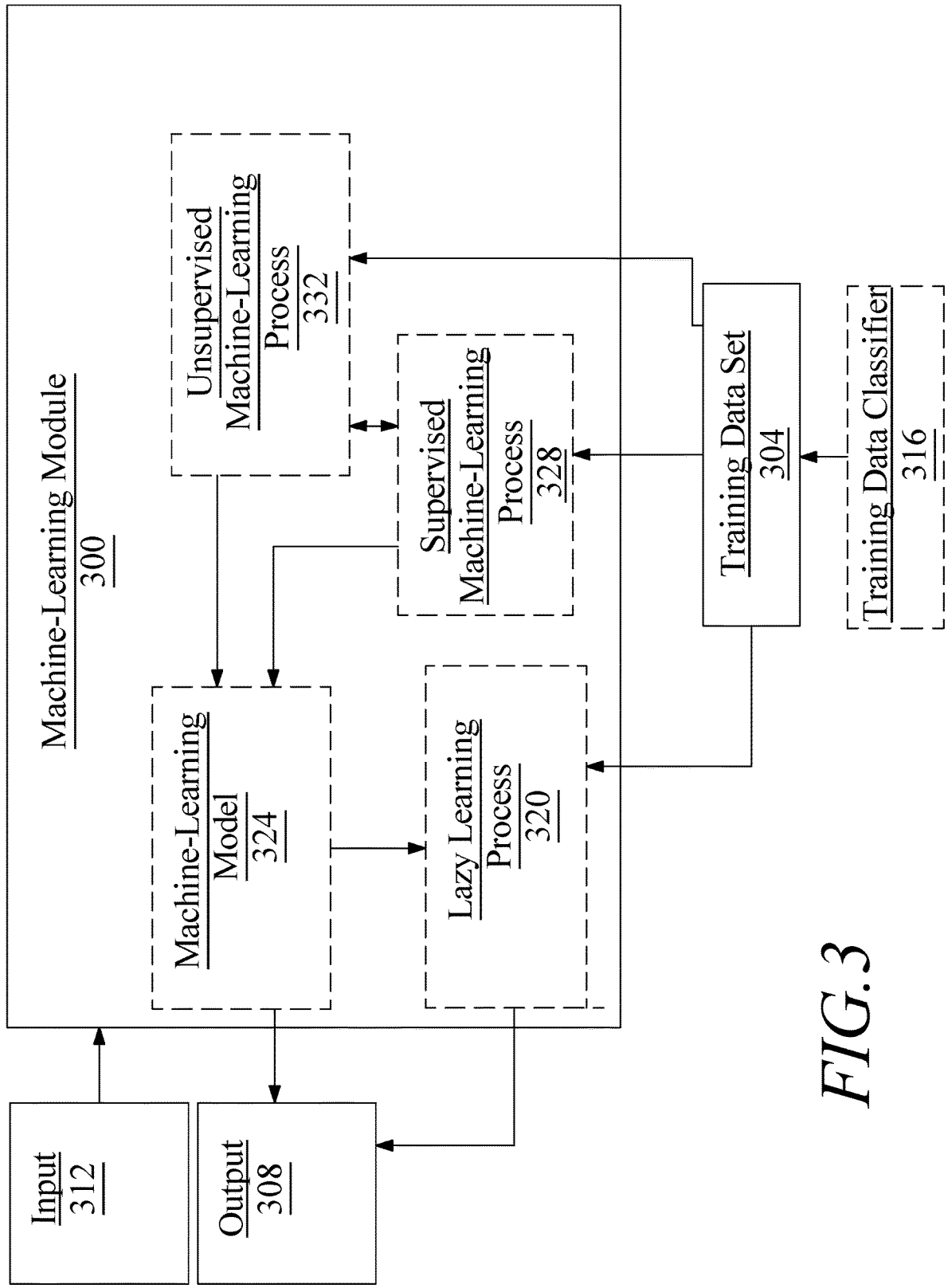
FIG. 3 is a block diagram of an exemplary embodiment of a machine-learning process.

Still referring to FIG. 3, "training data," as used herein, is data containing correlations that a machine-learning process may use to model relationships between two or more categories of data elements. For instance, and without limitation, training data 304 may include a plurality of data entries, each entry representing a set of data elements that were recorded, received, and/or generated together; data elements may be correlated by shared existence in a given data entry, by proximity in a given data entry, or the like. Multiple data entries in training data 304 may evince one or more trends in correlations between categories of data elements; for instance, and without limitation, a higher value of a first data element belonging to a first category of data element may tend to correlate to a higher value of a second data element belonging to a second category of data element, indicating a possible proportional or other mathematical relationship linking values belonging to the two categories. Multiple categories of data elements may be related in training data 304 according to various correlations; correlations may indicate causative and/or predictive links between categories of data elements, which may be modeled as relationships such as mathematical relationships by machine-learning processes as described in further detail below. Training data 304 may be formatted and/or organized by categories of data elements, for instance by associating data elements with one or more descriptors corresponding to categories of data elements. As a non-limiting example, training data 304 may include data entered in standardized forms by persons or processes, such that entry of a given data element in a given field in a form may be mapped to one or more descriptors of categories. Elements in training data 304 may be linked to descriptors of categories by tags, tokens, or other data elements; for instance, and without limitation, training data 304 may be provided in fixed-length formats, formats linking positions of data to categories such as comma-separated value (CSV) formats and/or self-describing formats such as extensible markup language (XML), JavaScript Object Notation (JSON), or the like, enabling processes or devices to detect categories of data.

Alternatively or additionally, and continuing to refer to FIG. 3, training data 304 may include one or more elements that are not categorized; that is, training data 304 may not be formatted or contain descriptors for some elements of data. Machine-learning algorithms and/or other processes may sort training data 304 according to one or more categorizations using, for instance, natural language processing algorithms, tokenization, detection of correlated values in raw data and the like; categories may be generated using correlation and/or other processing algorithms. As a non-limiting example, in a corpus of text, phrases making up a number "n" of compound words, such as nouns modified by other nouns, may be identified according to a statistically significant prevalence of n-grams containing such words in a particular order; such an n-gram may be categorized as an element of language such as a "word" to be tracked similarly to single words, generating a new category as a result of statistical analysis. Similarly, in a data entry including some textual data, a person's name may be identified by reference to a list, dictionary, or other compendium of terms, permitting ad-hoc categorization by machine-learning algorithms, and/or automated association of data in the data entry with descriptors or into a given format. The ability to categorize data entries automatedly may enable the same training data 304 to be made applicable for two or more distinct machine-learning algorithms as described in further detail below. Training data 304 used by machine-learning module 300 may correlate any input data as described in this disclosure to any output data as described in this disclosure. As a non-limiting illustrative example machine-learning process may input user preferences 112 and candidate transfer apparatus performance archive 124 and output a ranking of performance prognoses.

Further referring to FIG. 3, training data may be filtered, sorted, and/or selected using one or more supervised and/or unsupervised machine-learning processes and/or models as described in further detail below; such models may include without limitation a training data classifier 316. Training data classifier 316 may include a "classifier," which as used in this disclosure is a machine-learning model as defined below, such as a mathematical model, neural net, or program generated by a machine-learning algorithm known as a "classification algorithm," as described in further detail below, that sorts inputs into categories or bins of data, outputting the categories or bins of data and/or labels associated therewith. A classifier may be configured to output at least a datum that labels or otherwise identifies a set of data that are clustered together, found to be close under a distance metric as described below, or the like. Machine-learning module 300 may generate a classifier using a classification algorithm, defined as processes whereby a computing device and/or any module and/or component operating thereon derives a classifier from training data 304. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers. As a non-limiting example, training data classifier 316 may classify elements of training data to only correlate performance prognoses to candidate transfer apparatuses for transfer apparatuses capable of completing a transfer invocation, similarly to a cohort of persons and/or other analyzed items and/or phenomena for which a subset of training data may be selected.

Still referring to FIG. 3, machine-learning module 300 may be configured to perform a lazy-learning process 320 and/or protocol, which may alternatively be referred to as a "lazy loading" or "call-when-needed" process and/or protocol, may be a process whereby machine learning is conducted upon receipt of an input to be converted to an output, by combining the input and training set to derive the algorithm to be used to produce the output on demand. For instance, an initial set of simulations may be performed to cover an initial heuristic and/or "first guess" at an output and/or relationship. As a non-limiting example, an initial heuristic may include a ranking of associations between inputs and elements of training data 304. Heuristic may include selecting some number of highest-ranking associations and/or training data 304 elements. Lazy learning may implement any suitable lazy learning algorithm, including without limitation a K-nearest neighbors algorithm, a lazy naive Bayes algorithm, or the like; persons skilled in the art, upon reviewing the entirety of this disclosure, will be aware of various lazy-learning algorithms that may be applied to generate outputs as described in this disclosure, including without limitation lazy learning applications of machine-learning algorithms as described in further detail below.

Alternatively, or additionally, and with continued reference to FIG. 3, machine-learning processes as described in this disclosure may be used to generate machine-learning models 324. A "machine-learning model," as used in this disclosure, is a mathematical and/or algorithmic representation of a relationship between inputs and outputs, as generated using any machine-learning process including without limitation any process as described above, and stored in memory; an input is submitted to a machine-learning model 324 once created, which generates an output based on the relationship that was derived. For instance, and without limitation, a linear regression model, generated using a linear regression algorithm, may compute a linear combination of input data using coefficients derived during machine-learning processes to calculate an output datum. As a further non-limiting example, a machine-learning model 324 may be generated by creating an artificial neural network, such as a convolutional neural network comprising an input layer of nodes, one or more intermediate layers, and an output layer of nodes. Connections between nodes may be created via the process of "training" the network, in which elements from a training data 304 set are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

Still referring to FIG. 3, machine-learning algorithms may include at least a supervised machine-learning process 328. At least a supervised machine-learning process 328, as defined herein, include algorithms that receive a training set relating a number of inputs to a number of outputs, and seek to find one or more mathematical relations relating inputs to outputs, where each of the one or more mathematical relations is optimal according to some criterion specified to the algorithm using some scoring function. For instance, a supervised learning algorithm may include candidate transfer apparatus performance archive 124 and user preferences 112 as described above as inputs, performance prognoses 120 and candidate transfer apparatus model 128 as outputs, and a scoring function representing a desired form of relationship to be detected between inputs and outputs; scoring function may, for instance, seek to maximize the probability that a given input and/or combination of elements inputs is associated with a given output to minimize the probability that a given input is not associated with a given output. Scoring function may be expressed as a risk function representing an "expected loss" of an algorithm relating inputs to outputs, where loss is computed as an error function representing a degree to which a prediction generated by the relation is incorrect when compared to a given input-output pair provided in training data 304. Persons skilled in the art, upon reviewing the entirety of this disclosure, will be aware of various possible variations of at least a supervised machine-learning process 328 that may be used to determine relation between inputs and outputs. Supervised machine-learning processes may include classification algorithms as defined above.

Further referring to FIG. 3, machine learning processes may include at least an unsupervised machine-learning processes 332. An unsupervised machine-learning process, as used herein, is a process that derives inferences in datasets without regard to labels; as a result, an unsupervised machine-learning process may be free to discover any structure, relationship, and/or correlation provided in the data. Unsupervised processes may not require a response variable; unsupervised processes may be used to find interesting patterns and/or inferences between variables, to determine a degree of correlation between two or more variables, or the like.

Still referring to FIG. 3, machine-learning module 300 may be designed and configured to create a machine-learning model 324 using techniques for development of linear regression models. Linear regression models may include ordinary least squares regression, which aims to minimize the square of the difference between predicted outcomes and actual outcomes according to an appropriate norm for measuring such a difference (e.g. a vector-space distance norm); coefficients of the resulting linear equation may be modified to improve minimization. Linear regression models may include ridge regression methods, where the function to be minimized includes the least-squares function plus term multiplying the square of each coefficient by a scalar amount to penalize large coefficients. Linear regression models may include least absolute shrinkage and selection operator (LASSO) models, in which ridge regression is combined with multiplying the least-squares term by a factor of 1 divided by double the number of samples. Linear regression models may include a multi-task lasso model wherein the norm applied in the least-squares term of the lasso model is the Frobenius norm amounting to the square root of the sum of squares of all terms. Linear regression models may include the elastic net model, a multi-task elastic net model, a least angle regression model, a LARS lasso model, an orthogonal matching pursuit model, a Bayesian regression model, a logistic regression model, a stochastic gradient descent model, a perceptron model, a passive aggressive algorithm, a robustness regression model, a Huber regression model, or any other suitable model that may occur to persons skilled in the art upon reviewing the entirety of this disclosure. Linear regression models may be generalized in an embodiment to polynomial regression models, whereby a polynomial equation (e.g. a quadratic, cubic or higher-order equation) providing a best predicted output/actual output fit is sought; similar methods to those described above may be applied to minimize error functions, as will be apparent to persons skilled in the art upon reviewing the entirety of this disclosure.

Continuing to refer to FIG. 3, machine-learning algorithms may include, without limitation, linear discriminant analysis. Machine-learning algorithm may include quadratic discriminate analysis. Machine-learning algorithms may include kernel ridge regression. Machine-learning algorithms may include support vector machines, including without limitation support vector classification-based regression processes. Machine-learning algorithms may include stochastic gradient descent algorithms, including classification and regression algorithms based on stochastic gradient descent. Machine-learning algorithms may include nearest neighbors algorithms. Machine-learning algorithms may include Gaussian processes such as Gaussian Process Regression. Machine-learning algorithms may include cross-decomposition algorithms, including partial least squares and/or canonical correlation analysis. Machine-learning algorithms may include naive Bayes methods. Machine-learning algorithms may include algorithms based on decision trees, such as decision tree classification or regression algorithms. Machine-learning algorithms may include ensemble methods such as bagging meta-estimator, forest of randomized tress, AdaBoost, gradient tree boosting, and/or voting classifier methods. Machine-learning algorithms may include neural net algorithms, including convolutional neural net processes.

Still referring to FIG. 3, models may be generated using alternative or additional artificial intelligence methods, including without limitation by creating an artificial neural network, such as a convolutional neural network comprising an input layer of nodes, one or more intermediate layers, and an output layer of nodes. Connections between nodes may be created via the process of "training" the network, in which elements from a training data 304 set are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning. This network may be trained using training data 304.

Referring again to FIG. 1, computing device 104 may train a machine-learning process using the candidate transfer apparatus performance archive 124 and generate performance prognoses 120 as a function of candidate transfer apparatus model 128 and at least a transfer invocation 108. Performance prognoses 120 correspond to a plurality of candidate transfer apparatuses to deliver the at least a transfer invocation 108 in view of the at least user preferences 112. "Performance prognoses," for the purposes of this disclosure is a projection of transfer apparatus or apparatuses to physically transfer pieces from an origin location to a destination location in view of user preferences and how close to those user preferences the candidate transfer apparatus can operate. The plurality of performance prognoses 120 correspond to those transfer apparatuses that are able to deliver the at least a transfer invocation, which may include inputs by a user such as must-ship-by date, must-deliver-by date, order content (piece numbers, quantities, descriptions), freight class, transfer piece(s) dimensions, less-than-truckload (LTL) eligibility, specific mode constraints, and the like. The foregoing have been non-limiting, non-exhaustive examples.

With continued reference to FIG. 1, computing device 104 may be configured to select a candidate transfer apparatus as a function of the user preferences 112. Computing device 104 may select a candidate transfer apparatus as a function of the user preferences 112 which may include generating an objective function 132 of the plurality of performance prognoses 120. An "objective function," as used in this disclosure, is a mathematical function with a solution set including a plurality of data elements to be compared, such as without limitation plurality of candidate user preferences 112 combinations. Objective function generates an output ranking performance prognoses according to at least a goal criterion, which may include any criterion as described in further detail below. Computing device 104 may compute a score, metric, ranking, or the like, associated with each performance prognoses and candidate transfer apparatus and select objectives to minimize and/or maximize the score/rank, depending on whether an optimal result is represented, respectively, by a minimal and/or maximal score; an objective function may be used by computing device 104 to score each possible pairing. An objective function 132 may be based on one or more objectives, as described below. Computing device 104 may pair a candidate transfer apparatus, with a given combination of performance prognoses, that optimizes the objective function. In various embodiments a score of a performance prognoses may be based on a combination of one or more factors, including a plurality of user preferences or a plurality of constraints like transfer dates, arrival dates, load size (specifically LTL and full loads, as will described in further detail below), LTL loads within a specific apparatus' maximum load size, capacities by day and geography, piece type, whether pieces are palletized, number of stops or legs of a transfer, cross-docks, previous pricing, among others. Each factor may be assigned a score based on predetermined variables. In some embodiments, the assigned scores may be weighted or unweighted.

Optimization of an objective function 132 with a solution set including the plurality of candidate transfer apparatus may include performing a greedy algorithm process, where optimization is performed by minimizing and/or maximizing an output of objective function through selection of user preferences 112. A "greedy algorithm" is defined as an algorithm that selects locally optimal choices, which may or may not generate a globally optimal solution. For instance, computing device 104 may select objectives so that scores associated therewith are the best score for each goal. For instance, in non-limiting illustrative example, optimization may determine the combination of routes for a transfer apparatus or apparatuses such that each transfer combination includes the highest score possible, and thus the most optimal delivery.

Still referring to FIG. 1, objective function 132 may be formulated as a linear objective function, which computing device 104 may optimize using a linear program such as without limitation a mixed-integer program. A "linear program," as used in this disclosure, is a program that optimizes a linear objective function, given at least a constraint; a linear program maybe referred to without limitation as a "linear optimization" process and/or algorithm. For instance, in non-limiting illustrative examples, a given constraint might be route constraint, and a linear program may use a linear objective function to calculate minimal distance traversed without excess cost. In various embodiments, system 100 may determine a set of instructions towards achieving a user's goal that maximizes a total score subject to a constraint that there are other competing objectives. A mathematical solver may be implemented to solve for the set of instructions that maximizes scores; mathematical solver may be implemented on computing device 104 and/or another device in system 100, and/or may be implemented on third-party solver.

Still referring to FIG. 1, objective function 132 may be formulated as nonlinear least squares optimization process. A "nonlinear least squares optimization process," for the purposes of this disclosure, is a form of least squares analysis used to fit a set of m observations with a model that is non-linear in n unknown parameters, where m is greater than or equal to n. The basis of the method is to approximate the model by a linear one and to refine the parameters by successive iterations. A nonlinear least squares optimization process may output a fit of performance prognoses 120 to user preferences 112.

With continued reference to FIG. 1, generating an objective function of the plurality of candidate transfer apparatus may include minimizing a loss function, where a "loss function" is an expression an output of which a ranking process minimizes to generate an optimal result. As a non-limiting example, computing device 104 may assign variables relating to a set of parameters, which may correspond to score components as described above, calculate an output of mathematical expression using the variables, and select an objective that produces an output having the lowest size, according to a given definition of "size," of the set of outputs representing each of plurality of candidate ingredient combinations; size may, for instance, included absolute value, numerical size, or the like. Selection of different loss functions may result in identification of different potential pairings as generating minimal outputs Continuing in reference to FIG. 1, computing device 104 may select a candidate transfer apparatus for which the output of the objective function indicates a maximal satisfaction of the at least a goal criterion; a maximal satisfaction of at least a goal criterion may be determined by optimizing objective function, either by minimizing an output of an objective function formulated to represent more desirable inputs using smaller outputs, such as a loss function, and/or maximizing an output of an objective function formulated to represent more desirable inputs using larger outputs. In non-limiting illustrative examples, objective function 132 may be optimized, for instance, by minimizing transfer time of a piece given a plurality of performance prognoses 120, wherein the optimized objective function 132 may rank the candidate transfer apparatuses based upon the average transfer time for each candidate transfer apparatus performance prognosis 120 as a function of the user preferences 112.

Continuing to refer to FIG. 1, the objective function 132 may include a solution set including the plurality of performance prognoses 120 corresponding to each candidate transfer apparatus. The objective function 132 may output a data structure consistent with the entirety of this disclosure. The output of objective function 132 may comprise a ranking of performance prognoses, the more closely aligned with user preferences 112, the more highly ranked.

Continuing in reference to FIG. 1, computing device 104 may determine a solution set including the plurality of performance prognoses with regard to rank using the generated objective function 132. For instance, and without limitation, optimizing the objective function 132 may include iteratively calculating the difference between performance prognoses 120 in view of user preferences 112 and candidate transfer apparatus capable of completing a user invocation 108. Performance prognoses 120 may be determined using the optimization for transfer apparatus, wherein the prognoses is a projection of how well a transfer apparatus completes a user invocation 108 according to user preferences 112, for instance and without limitation, by a customer or a transfer apparatus. An objective function 132 may be optimized on minimizing time differences to measure the efficiency of transfer that result in completion and rank them accordingly.

Continuing in reference to FIG. 1, computing device 104 may generate an output of scoring performance prognoses 120 according to at least a goal criterion by scoring with regard to difference between a performance prognosis 120 and user preferences 112 using objective function 132. Objective function 132 may be optimized by measuring, finding, calculating, or otherwise determining the difference between a projected metric from candidate transfer apparatus performance prognosis and user preference of the same category, for instance and without limitation, preferred route deviation, transfer date, piece limit, and the like. Objective function 132 may result in re-ranking performance prognoses 120 of a plurality of performance prognoses 120 based upon these calculations. For instance, in non-limiting examples, objective function 132 may re-rank performance prognoses 120 if time can be minimized such that a piece may begin transfer and arrival to destination time. In further non-limiting examples, objective function 132 may be optimized to prioritize performance prognoses 120 based upon another user preference or datum as described in the entirety of this disclosure. The final output of the machine-learning process is a ranking of performance prognoses 120 corresponding to candidate transfer apparatuses.

Continuing to refer to FIG. 1, computing device 104 may be configured to select a candidate transfer apparatus of the plurality of candidate transfer apparatuses for which the output of performance prognoses 120 maximizes the rank. In a non-limiting example, a selected candidate transfer apparatus may average the difference between a plurality of performance metrics and user preferences, and select the candidate transfer apparatus for which the average difference is minimized, as described in the entirety of this disclosure. This minimization of average difference metric would maximize the rank of the plurality of performance prognoses 120.

Continuing in reference to FIG. 1, computing device 104 may select a candidate transfer apparatus as a function of the optimized objective function 132. A candidate transfer apparatus may include a tabulation of all necessary user preferences 112 for completing a plurality of user invocations, which may have been generated and then ranked based upon deviation and/or user preferences. For instance, an objective function 132 may be optimized, as described above, to rank user preferences 112 elements in a combination of user preferences 112 as it relates to calculated differences between projected metrics and user preference metrics of completion of a user invocation 108 to rank, score, or otherwise prioritize user preferences 112 to generate a prioritized user preferences 112 combination. A candidate transfer apparatus may include a prioritized user preferences 112 combination, which has been prioritized based on chronological prioritization, among other prioritizations, that results in a series of steps, instructions, or the like, that may be communicated to transfer apparatuses, companies, or users.

Candidate transfer apparatus may include signifiers, numerical values, alphanumerical codes, and the like that contain elements of data regarding feasibilities, resource amounts, time amounts, constraints, and/or any other identifiable parameters that may be used in determining a prioritized user preferences 112 combination for a plurality of transfer apparatuses. Candidate transfer apparatus and the above associated data may then be stored and/or retrieved from database 116 for device communication to users, for instance transfer apparatus staff, delivery drivers, and the like, and/or for subsequent user preferences 112 generation, modification, resource calculation, instruction generation, and the like. In non-limiting illustrative examples, a candidate transfer apparatus may include user preferences 112 that correspond to the transfer pieces to origin locations to destination locations, wherein computing device 104 may receive elements of a combination of user preferences 112 that is pertinent to the transfer particular pieces, and a user may only receive a single user preferences 112. In such an example, the candidate transfer apparatus combines instructions for all apparatuses involved in completing piece transfer in the most efficient manner, while also maintaining data relating to the used and outstanding constraints, conflicts, of the like, that were avoided, or may still arise. Computing device 104 may store and/or retrieve candidate transfer apparatuses database for subsequent use as candidate transfer apparatus archive 124, for instance and without limitation, if a user invokes later transfers of pieces, this may result in optimal functions that have generated past prioritized user preferences 112 that may be retrieved, modified, or otherwise repurposed.

With continuing reference to FIG. 1, a computing device 104 may be configured to provide the selected candidate transfer apparatus to a user. Providing the selected candidate transfer apparatus to a user may further comprise outputting the route, apparatus, cost, and the like to a user who has submitted at least a user invocation 108. Providing may further be characterized as an electronic mail message, notification to a user device, like a tablet, computer, smartphone, or other client electronic device. Providing the selected candidate transfer apparatus may comprise a list of routes, stops, purchase orders, piece lists, manifests, weights, among other information for every leg of a transfer from one destination to a second destination, as output by system 100.

Figure 4:
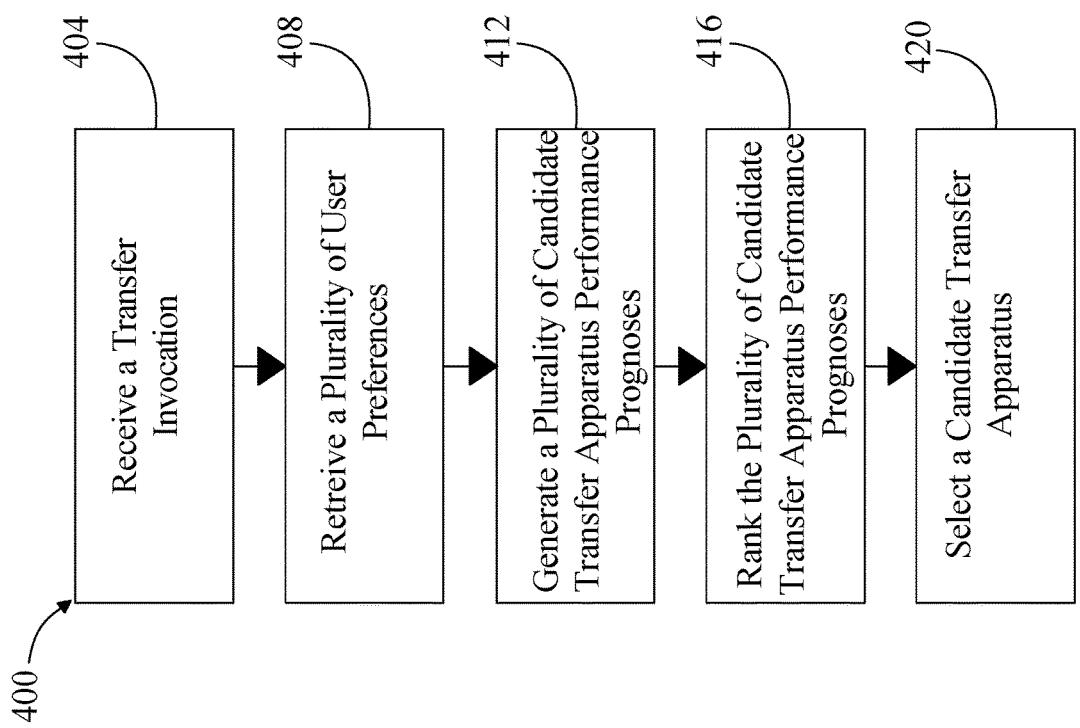
FIG. 4 is a block diagram illustrating an exemplary embodiment of a method for selecting a candidate transfer apparatus.

Referring now to FIG. 4, a method 400 for selecting a candidate transfer apparatus using a machine-learning process is illustrated. At step 404, computing device 104 may be configured to receive a plurality of user invocations 108, wherein a plurality of user invocations 108 may include computing device 104 retrieving recorded past information based on previous user invocations from database 216; this may be implemented, without limitation, as described above in reference to FIGS. 1-4.

At step 408, computing device 104 may retrieve a plurality of user preferences 112, wherein retrieving may include retrieving, for each aspect of user invocation 108, a user preference identifying a plurality of user preferences for how a transfer apparatus is desired to operate; this may be implemented, without limitation, as described above in reference to FIGS. 1-4. Computing device 104 may identify, for each user preference, a metric corresponding to the user preference, wherein the user preferences may be inputted or retrieved from database 216.

At step 412, computing device 104 may generate a plurality of performance prognoses 120, wherein each candidate transfer apparatus performance prognosis further comprises receiving, for a corresponding candidate apparatus of the plurality of candidate transfer apparatus, a candidate transfer apparatus archive; this may be implemented, without limitation, as described above in reference to FIGS. 1-4. Generating the plurality of performance prognoses 120 may further comprise training, as a function of the candidate transfer apparatus archive 124, which correlates input preferences to output prognoses, train a machine-learning process to generate performance prognoses; generating performance prognoses may include receiving candidate transfer apparatus archive training data, wherein training data further comprises a plurality of entries correlating user preferences to performance prognoses, training a machine-learning process 300 using the training data, and generating a plurality of performance prognoses 120 as a function of candidate transfer apparatus model and the at least a transfer invocation.

At step 416, computing device 104 may rank a plurality of performance prognoses corresponding to each candidate transfer apparatus, wherein ranking may comprise generating, as an objective function, with a solution set including the plurality of performance prognoses 120 corresponding to each candidate transfer apparatus. The objective function generates an output ranking of performance prognoses 120; this may be implemented, without limitation, as described herein in reference to FIGS. 1-5.

At step 420, computing device 104 may select a candidate transfer apparatus, of the plurality of candidate transfer apparatuses, wherein selecting may include generating an objective function of the plurality of performance prognoses, wherein the objective function is a mathematical function with a solution set including the plurality of performance prognoses the objective function generates an output scoring transfer apparatus performance prognoses according to at least a goal criterion, and selecting a candidate transfer apparatus for which the output of the objective function indicates a maximal satisfaction of the at least a goal criterion; this may be implemented, without limitation, as described herein in reference to FIGS. 1-4. Selecting a candidate transfer apparatus further comprises using the objective function to rank performance prognoses according to adherence to user preferences. Generating the objective function of the plurality of performance prognoses may include performing linear optimization. Generating the objective function of the plurality of performance prognoses may include performing mixed integer optimization. Generating the objective function of the plurality of performance prognoses may include performing nonlinear least squares optimization. The objective function may include a loss function and generating the objective function with a solution set including the plurality of performance prognoses may include minimizing the loss function. Generating the objective function may include determining a solution set including the plurality of performance prognoses regarding user preferences. Generating an output of scoring performance prognoses according to at least a goal criterion may include scoring with regard to difference between user preferences and performance prognoses.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 5:
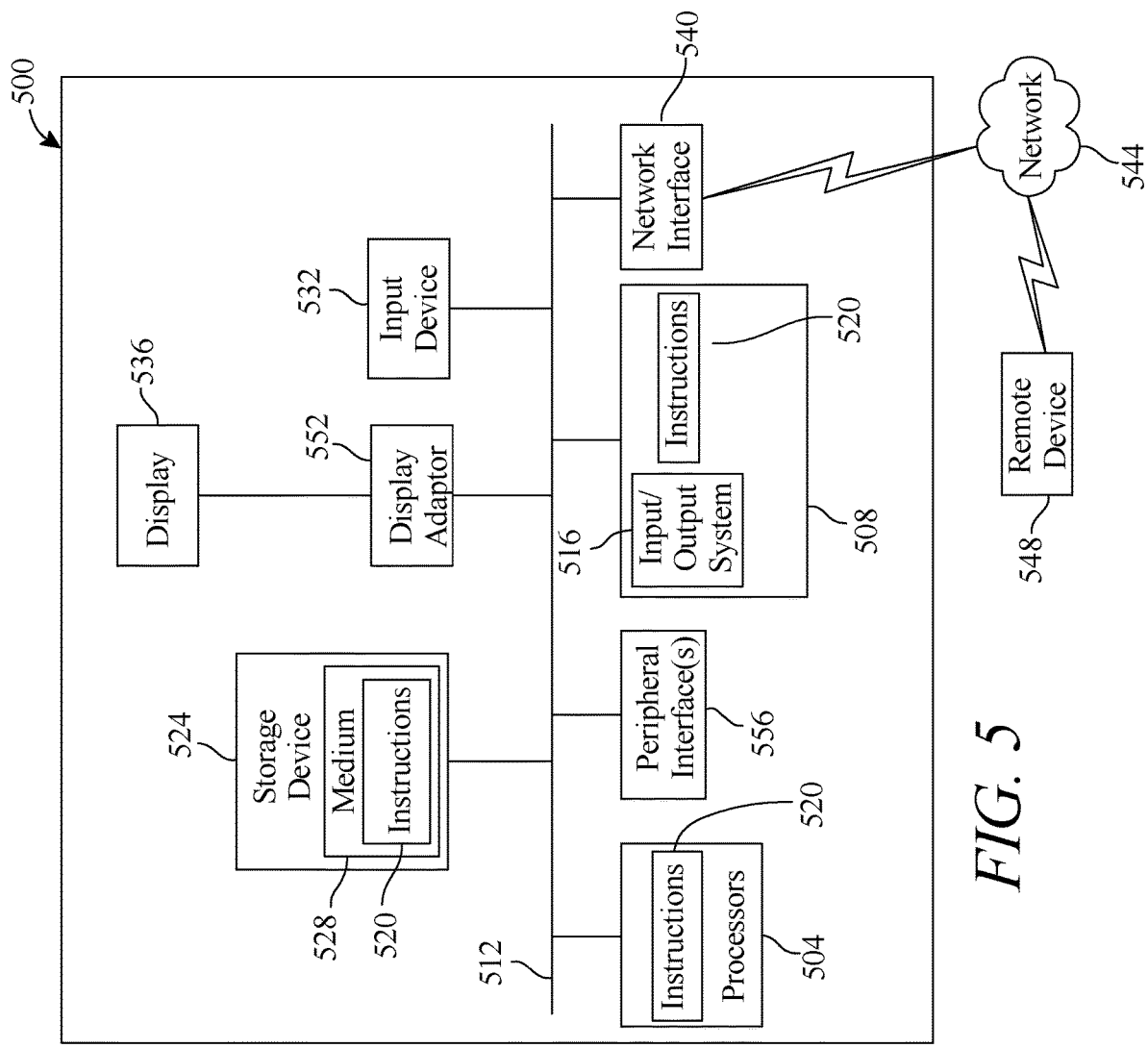
FIG. 5 is a block diagram of a computing system that can be used to implement any one or more of the methodologies disclosed herein and any one or more portions thereof.

FIG. 5 shows a diagrammatic representation of one embodiment of a computing device in the exemplary form of a computer system 500 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 500 includes a processor 504 and a memory 508 that communicate with each other, and with other components, via a bus 512. Bus 512 may include any of several types of bus structures including, but not limited to, a memory bus, a memory controller, a peripheral bus, a local bus, and any combinations thereof, using any of a variety of bus architectures.

Processor 504 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 504 may be organized according to Von Neumann and/or Harvard architecture as a non-limiting example. Processor 504 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating point unit (FPU), and/or system on a chip (SoC).

Memory 508 may include various components (e.g., machine-readable media) including, but not limited to, a random-access memory component, a read only component, and any combinations thereof. In one example, a basic input/output system 516 (BIOS), including basic routines that help to transfer information between elements within computer system 500, such as during start-up, may be stored in memory 508. Memory 508 may also include (e.g., stored on one or more machine-readable media) instructions (e.g., software) 520 embodying any one or more of the aspects and/or methodologies of the present disclosure. In another example, memory 508 may further include any number of program modules including, but not limited to, an operating system, one or more application programs, other program modules, program data, and any combinations thereof.

Computer system 500 may also include a storage device 524. Examples of a storage device (e.g., storage device 524) include, but are not limited to, a hard disk drive, a magnetic disk drive, an optical disc drive in combination with an optical medium, a solid-state memory device, and any combinations thereof. Storage device 524 may be connected to bus 512 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 524 (or one or more components thereof) may be removably interfaced with computer system 500 (e.g., via an external port connector (not shown)). Particularly, storage device 524 and an associated machine-readable medium 528 may provide nonvolatile and/or volatile storage of machine-readable instructions, data structures, program modules, and/or other data for computer system 500. In one example, software 520 may reside, completely or partially, within machine-readable medium 528. In another example, software 520 may reside, completely or partially, within processor 504.

Computer system 500 may also include an input device 532. In one example, a user of computer system 500 may enter commands and/or other information into computer system 500 via input device 532. Examples of an input device 532 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 532 may be interfaced to bus 512 via any of a variety of interfaces (not shown) including, but not limited to, a serial interface, a parallel interface, a game port, a USB interface, a FIREWIRE interface, a direct interface to bus 512, and any combinations thereof. Input device 532 may include a touch screen interface that may be a part of or separate from display 536, discussed further below. Input device 532 may be utilized as a user selection device for selecting one or more graphical representations in a graphical interface as described above.

A user may also input commands and/or other information to computer system 500 via storage device 524 (e.g., a removable disk drive, a flash drive, etc.) and/or network interface device 540. A network interface device, such as network interface device 540, may be utilized for connecting computer system 500 to one or more of a variety of networks, such as network 544, and one or more remote devices 548 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 544, may employ a wired and/or a wireless mode of communication. In general, any network topology may be used. Information (e.g., data, software 520, etc.) may be communicated to and/or from computer system 500 via network interface device 540.

Computer system 500 may further include a video display adapter 552 for communicating a displayable image to a display device, such as display device 536. Examples of a display device include, but are not limited to, a liquid crystal display (LCD), a cathode ray tube (CRT), a plasma display, a light emitting diode (LED) display, and any combinations thereof. Display adapter 552 and display device 536 may be utilized in combination with processor 504 to provide graphical representations of aspects of the present disclosure. In addition to a display device, computer system 500 may include one or more other peripheral output devices including, but not limited to, an audio speaker, a printer, and any combinations thereof. Such peripheral output devices may be connected to bus 512 via a peripheral interface 556. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods, systems, and software according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. A method for determining a transfer apparatus based on user preferences, the method comprising:
    receiving, by a computing device, at least a transfer invocation and a plurality of user preferences;
    generating, by the computing device and for each candidate transfer apparatus of a plurality of candidate transfer apparatuses, a plurality of performance prognoses corresponding to the plurality of user preferences, wherein generating each plurality of performance prognoses further comprises:
        receiving, for a corresponding candidate transfer apparatus of the plurality of candidate transfer apparatuses, a candidate transfer apparatus archive;
        iteratively training, as a function of the candidate transfer apparatus performance archive and the plurality of user preferences, a candidate transfer apparatus model, wherein the candidate transfer apparatus model is configured to receive the candidate transfer apparatus performance archive and the plurality of user preferences as inputs to output the plurality of performance prognoses and a scoring function correlating a desired form of relationship to be detected between the inputs and the outputs, wherein the scoring function maximizes a probability that a given input of the inputs is associated with a given output of the outputs to minimize the probability that the given input is not associated with the given output;
        retraining the candidate transfer apparatus model to optimize the relationship between the candidate transfer apparatus performance archive, the plurality of user preferences and the plurality of performance prognoses using the scoring function; and
        generating the plurality of candidate transfer apparatus performance prognoses as a function of the candidate transfer apparatus model and the at least a transfer invocation;
    generating an objective function of the user preferences, wherein the objective function corresponds the plurality of performance prognoses to the plurality of candidate transfer apparatus;
    performing a greedy process to optimize the objective function through selection of the plurality of user preferences, wherein the optimization determines a combination of routes for the candidate transfer apparatus such that each transfer combination includes a highest possible score;
    generating, by the objective function, a ranking of the plurality of performance prognoses as a function of a goal criterion, wherein the objective function iteratively calculates a difference between the plurality of performance prognoses as a function of the plurality of user preferences and the plurality of candidate transfer apparatuses capable of completing the transfer invocation;
    re-ranking, by the objective function, the plurality of performance prognoses as a function of the calculation;
    selecting, by the computing device, a candidate transfer apparatus as a function of the plurality of performance prognoses; and
    providing to a user, by the computing device, information relating to the selected candidate transfer apparatus.

2. The method of claim 1, wherein selecting the candidate transfer apparatus further comprises performing a linear optimization process.

3. The method of claim 1, wherein selecting the candidate transfer apparatus further comprises performing a mixed integer optimization.

4. The method of claim 1, wherein selecting the candidate transfer apparatus further comprises performing a nonlinear least squares optimization process.

5. The method of claim 1, wherein each plurality of performance prognoses corresponds to a candidate transfer apparatus able to deliver the at least a transfer invocation in view of the at least user preferences.

6. The method of claim 1, wherein generating each of the plurality of performance prognoses includes receiving a candidate transfer apparatus archive which includes information regarding a candidate transfer apparatus's transfer performance as a function of user preferences data indicating deviations from user preferences.

7. The method of claim 1, wherein the transfer invocation includes a user invocation to transfer pieces to a destination.

8. The method of claim 1, wherein the candidate transfer apparatus model includes multiple transfer options where direct transfers and cross-dock transfers are used simultaneously.

9. The method of claim 1, wherein user preferences are received from a database.

10. The method of claim 1, wherein candidate transfer apparatus archive is received from a database.

11. A system for selecting a candidate transfer apparatus based on user preferences, the system including a computing device, the computing device configured to:
    receive at least a transfer invocation and a plurality of user preferences;
    generate, for each candidate transfer apparatus of a plurality of candidate transfer apparatuses, a plurality of performance prognoses corresponding to the plurality of user preferences, wherein generating each plurality of performance prognoses further comprises:
        receiving, for a corresponding candidate transfer apparatus of the plurality of candidate transfer apparatuses, a candidate transfer apparatus archive;
        iteratively training, as a function of the candidate transfer apparatus performance archive and the plurality of user preferences, a candidate transfer apparatus model, wherein the candidate transfer apparatus model is configured to receive the candidate transfer apparatus performance archive and the plurality of user preferences as inputs to output the plurality of performance prognoses and a scoring function correlating a desired form of relationship to be detected between the inputs and the outputs, wherein the scoring function maximizes a probability that a given input of the inputs is associated with a given output of the outputs to minimize the probability that the given input is not associated with the given output; and retraining the candidate transfer apparatus model to optimize the relationship between the candidate transfer apparatus performance archive, the plurality of user preferences and the plurality of performance prognoses using the scoring function; and generating the plurality of candidate transfer apparatus performance prognoses as a function of the candidate transfer apparatus model and the at least a transfer invocation;

generating an objective function of the user preferences, wherein the objective function corresponds the plurality of performance prognoses to the plurality of candidate transfer apparatuses;

performing a greedy process to optimize the objective function through selection of the plurality of user preferences, wherein the optimization determines a combination of routes for the plurality of candidate transfer apparatuses such that each transfer combination includes a highest possible score;

generating, by an objective function, a ranking of the plurality of performance prognoses as a function of a goal criterion, wherein the objective function iteratively calculates a difference between the plurality of performance prognoses as a function of the plurality of user preferences and the plurality of candidate transfer apparatuses capable of completing the transfer invocation;

re-ranking, by the objective function, the plurality of performance prognoses as a function of the calculation;

selecting a candidate transfer apparatus as a function of the plurality of performance prognoses; and providing to a user, information relating to the selected candidate transfer apparatus.

12. The system of claim 11, wherein selecting the candidate transfer apparatus further comprises performing a linear optimization process.

13. The system of claim 11, wherein selecting the candidate transfer apparatus further comprises performing a mixed integer optimization.

14. The system of claim 11, wherein selecting the candidate transfer apparatus further comprises performing a nonlinear least squares optimization process.

15. The system of claim 11, wherein the plurality of performance prognoses correspond to a plurality of candidate transfer apparatus able to deliver the at least a transfer invocation in view of the at least user preferences.

16. The system of claim 11, wherein generating each of the plurality of performance prognoses includes receiving a candidate transfer apparatus archive which includes information regarding a candidate transfer apparatus's transfer performance as a function of user preferences data indicating deviations from user preferences.

17. The system of claim 11, wherein the transfer invocation includes a user invocation to transfer pieces to a destination.

18. The system of claim 11, wherein the candidate transfer apparatus model includes multiple transfer options where direct transfers and cross-dock transfers are used simultaneously.

19. The system of claim 11, wherein user preferences are received from a database.

20. The system of claim 11, wherein candidate transfer apparatus archive is received from a database.

* * * * *